Feb. 22, 1944. C. B. GATY 2,342,511
RETRACTABLE DRIVE FOR FILM MAGAZINES
Original Filed May 24, 1941 4 Sheets-Sheet 3

INVENTOR
CLINTON B. GATY.
BY
Blair, Curtis + Hayward
ATTORNEYS

Feb. 22, 1944.   C. B. GATY   2,342,511
RETRACTABLE DRIVE FOR FILM MAGAZINES
Original Filed May 24, 1941    4 Sheets-Sheet 4

INVENTOR
CLINTON B. GATY.
BY
Blair, Curtis + Hayward
ATTORNEYS

Patented Feb. 22, 1944

2,342,511

UNITED STATES PATENT OFFICE 2,342,511

RETRACTABLE DRIVE FOR FILM MAGAZINES

Clinton B. Gaty, Jamaica, N. Y., assignor to Fairchild Aviation Corporation, Jamaica, N. Y., a corporation of Delaware Original application May 24, 1941, Serial No. 395,098. Divided and this application January 14, 1942, Serial No. 426,679

6 Claims. (Cl. 88—17)

This invention relates to motion picture cameras and more particularly to a drive for a removable film magazine.

This application is a division of the copending application of Clinton B. Gaty and George Rattray, Serial No. 395,098, filed May 24, 1941.

Small motion picture cameras of the eight and sixteen millimeter type in many instances use film magazines which may be placed in or taken out of a compartment in the camera regardless of the amount of film which has been exposed. A magazine of this type usually has a depression in its side in which a driven sprocket is disposed so that a number of such magazines may be conveniently stacked and so that a single magazine may be easily inserted in or withdrawn from the magazine simply in the camera. Where such a recessed sprocket is used, it is necessary that the driving spindle therefor, which is carried by the camera, be extendable and retractable so as to engage the driven sprocket when the magazine is placed in the camera and so as to be retractable therefrom to permit removal of the magazine from the camera. Where a retractable spindle of this type is used, it is important that the spindle be completely retracted before insertion of the film magazine so as to preclude damage thereto and damage to the magazine when the magazine is placed in the camera. It is equally important that the spindle be completely retracted when it is desirable to remove the film magazine in order to prevent damage to any portion of the film driving mechanism through the jamming of the spindle and sprocket or the spindle and any portion of the magazine.

Inasmuch as it is practically impossible to determine the static position of the spindle prior to the insertion of the magazine into the camera and inasmuch as the spindle teeth may be out of registry with the sprocket, there should be some provision whereby the spindle and sprocket initially out of registry may subsequently interengage without damage to either.

It is among the objects of this invention to provide a driving connection for a removable film magazine which though simple and sturdy in construction is capable of effective operation without damage to any part of the drive mechanism of the camera or the magazine or to the magazine itself. It is another object of this invention to provide a control for the film magazine drive which positively precludes insertion or removal of the magazine except when the driving connection between the camera and the magazine is completely disconnected. Other objects will be in part apparent and in part pointed out hereinafter.

The invention accordingly consists in the features of construction, combinations of elements, and arrangements of parts as will be exemplified in the structure to be hereinafter described, and the scope of the application of which will be indicated in the following claims.

In the drawings in which is shown one of the various possible embodiments of the invention, Figure 1 is an elevation of a camera of the type under consideration;

Similar reference characters refer to similar parts throughout the various views of the drawings.

Figure 1:
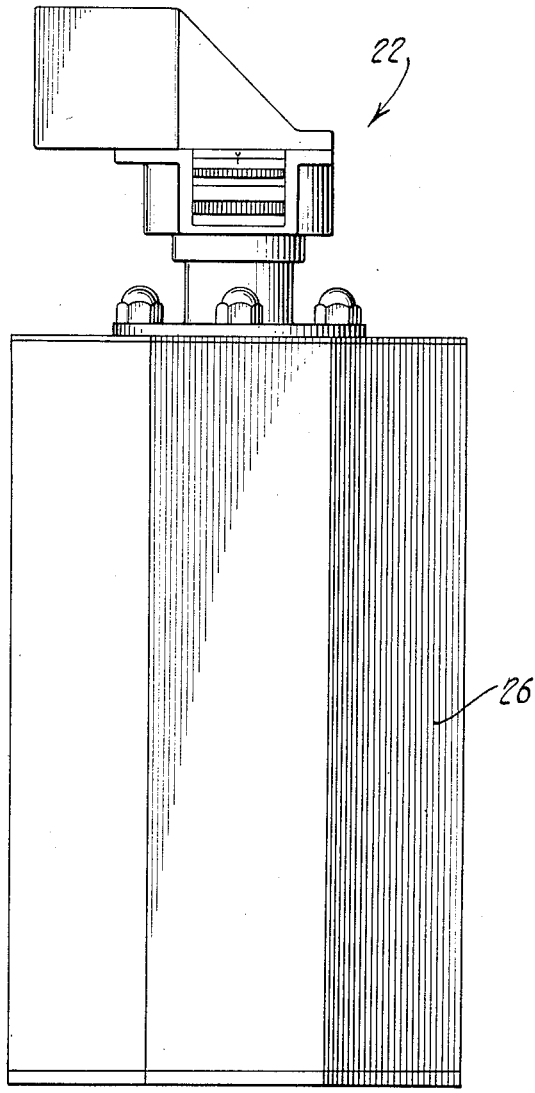

As shown in Figure 1, camera 22 includes a casing 26 which houses the film magazine, shutter operating mechanism, film feeding system, and the drive therefor. Only the film feeding system, in so far as the connection between the drive mechanism and its connection with the film magazine is concerned, will be considered herein.

Figure 3:
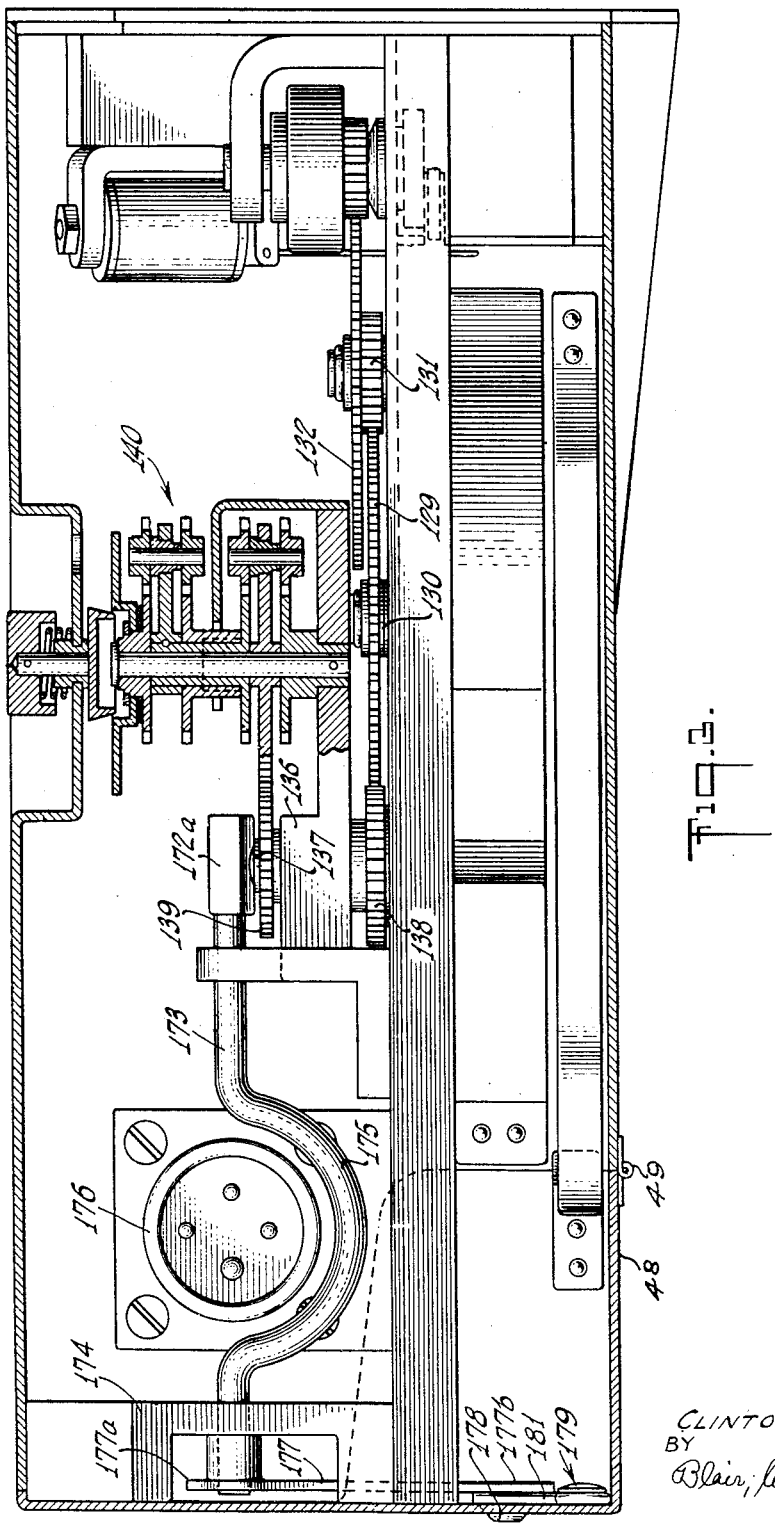
Figure 3 is a section taken along the line 3—3 of Figure 2, a portion thereof being broken away and a portion being shown in section; and, Figure 4 is an enlarged staggered section taken along the line 4—4 of Figure 1.
Figure 4:
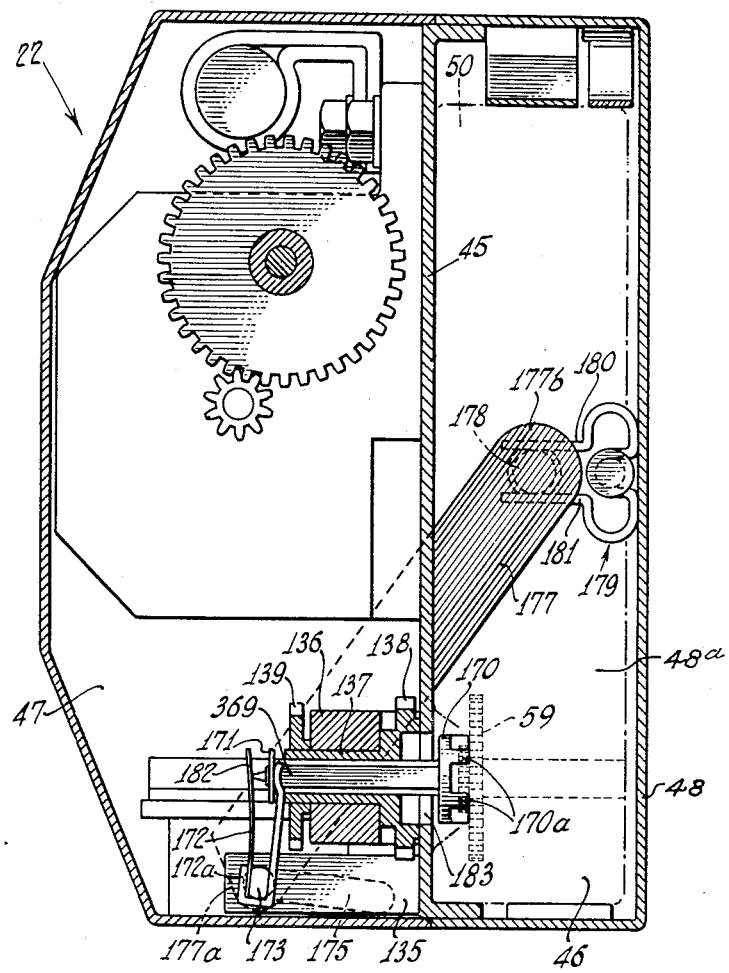

As shown in Figure 4, camera casing 26 has extending longitudinally therethrough a partition 45 which divides the compartment or chamber into a film magazine casing 46 and an operating mechanism compartment 47. As is better shown in Figure 3, these compartments are permanently closed at the right-hand end and are provided at the other end with a closure or door 48 hinged at 49 to the bottom of casing 26. Compartment 46 is dimensioned to receive a commercial film magazine, generally indicated at 50 (Figure 4), such as, for example, that shown in the United States patent to O. Wittel et al., Serial No. 2,126,299.

Figure 2:
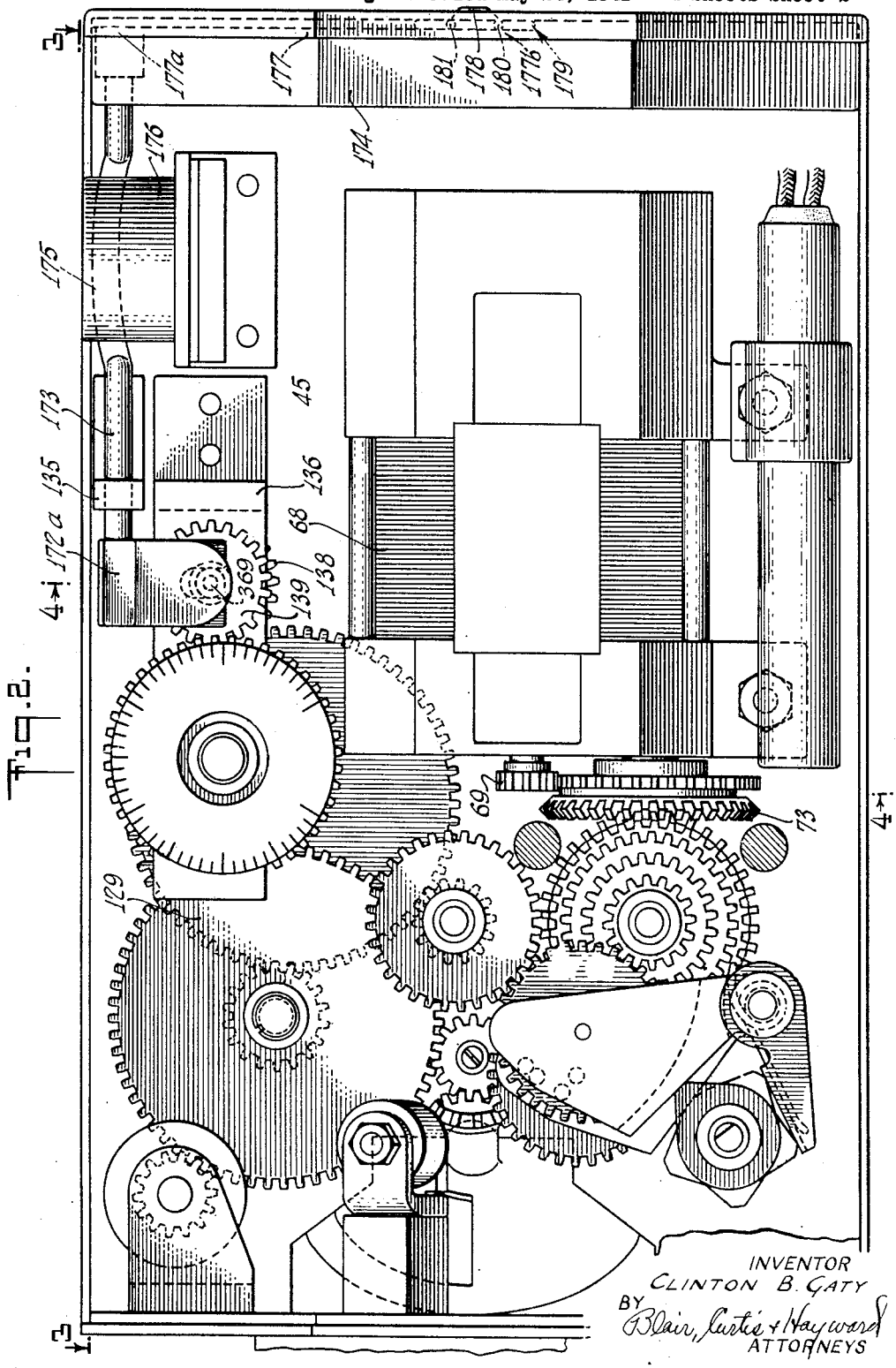
Figure 2 is an enlarged elevation of the front of the camera with the front plate removed to show a portion of the film drive mechanism.

Referring now to Figure 2, partition 45 of casing 26 supports within the drive mechanism compartment of the camera a motor 68 on the armature of which is mounted a small spur gear 69. This spur gear 69 meshes with a large spur gear 72 which through a clutch device (not shown) drives a bevel gear 73. Bevel gear 73 drives a large gear 132 through a train of gears particularly described in the above-noted copending application, and this gear 132 drives the film advancing mechanism, also particularly described in the same copending application. Bevel gear 73 and the train of gears driven thereby also drive a large gear 129 rotatably mounted on a stud 130 (Figure 3) secured to and extending from partition 45. Partition 45 also has secured thereto an angle 135 to the upwardly extending arm of which is secured a mounting plate 136 which provides suitable support for the film footage indicator, generally indicated at 140, and the drive mechanism therefor. As is more clearly shown in Figure 4, plate 136 rotatably supports the elongated hub 137 of a gear 138, which gear (see Figure 3) meshes with large gear 129. On the upper end of hub 137, as viewed in Figure 3, is secured a spur gear 139 which drives the film footage indicator 140. The film footage indicator is specifically described in the above-noted copending application.

As shown in Figure 4, the bore of gear hub 137 is splined and slidably receives a splined shaft 369. At one end of splined shaft 369 is a toothed spindle 170, the teeth 170a of which are insertable in pockets formed in the sprocket and driven member 59 of the film magazine 50. Thus it will appear that when gear 138 (Figure 3) is driven by gear 129 and sprocket 59 (Figure 4) is engaged by spindle teeth 170a, the film in magazine 50 is drawn from the supply spool (not shown) therein and rewound on the rewind spool (not shown) in the customary manner.

To permit insertion of film magazine 50 within its compartment 46, spindle 170 is retractable from the film compartment. To accomplish this, the other end of shaft 369 has secured thereto a washer 171 against which the bifurcated end of a rigid arm 172 is adapted to bear when shaft 369 and accordingly spindle 170 are moved in sprocket disengaging direction. The other end 172a of arm 172 is looped about and secured to the end of an operating shaft 173 (Figure 3). One end of shaft 173 is journaled in the upper end of angle 135, the other end of the shaft being journaled in a U-shaped bracket 174 secured to partition 45. Shaft 173 is curved or bent as at 175 to clear a socket 176 which provides the lead-in terminals for motor 68 and other electrically actuated devices in the camera such as described in the above-noted application. On the left-hand end of shaft 173 in Figure 3 is secured an operating arm or lever 177, the upper end 177a of which is secured to the shaft and lies within compartment 47, and the lower end 177b of which extends into the film magazine compartment 46 (Figure 4) close to and preferably parallel with side 48a of door 48. A pin 178 extends from end 177b of lever 177, and when the lever is in the position shown in Figure 4, pin 178 registers with and extends through an opening in side 48a (Figure 3) of door 48 when the door is closed. To facilitate the locating of pin 178 in the hole of door side 48a, there is provided a spring generally indicated at 179 (Figure 4). The two arms 180 and 181 embrace opposite sides of pin 178 and act as a guide therefor upon closing of the door as well as a retaining device for holding lever 177 in proper position when the door is closed.

As shown in the lower left-hand portion of Figure 4, a resilient arm of lever spring 182 has one end thereof secured to the shaft 173, and the other end of the spring presses against the left-hand end of shaft 369. Thus when shaft 173 is turned clockwise, as viewed in Figure 4, shaft 169 is resiliently biased toward the film feed sprocket 59 so that if the teeth 170a on spindle 170 are not in proper position to enter the sprocket, they may ride thereover until they register with the pockets therein, at which time spring arm 182 snaps the spindle teeth 170a into position.

From the above it will appear that when lever 177 is pivoted counterclockwise from the position shown in Figure 4, the rigid arm 172 by reason of its engagement with washer 171 retracts spindle 170 into a space 183 provided therefor in partition 45 and gear 138. In other words, lever 177 and spindle 170 are completely withdrawn from film magazine compartment 46 so as to permit free insertion or withdrawal of the film magazine. Unless the lever and disc are thus completely retracted, the film magazine can neither be inserted nor withdrawn from compartment 46, and jamming of the feed drive is positively precluded. For the same reason when the film magazine is in proper operative position in compartment 46, and lever 177 and spindle 170 are in the position shown in Figure 4, it is impossible to withdraw the film magazine from its compartment or insert the magazine into the compartment, as the lever forms a positive stop against such withdrawal or insertion regardless of the position of door 48 (Figure 3). This also precludes jamming of the film feed driving mechanism there or the film mechanism in its compartment. It will also appear that the only manner in which spindle 170 can be engaged with sprocket 59 or disengaged therefrom is through the manual manipulation of lever 177. Furthermore, the relationship between lever 177 and shaft 173 and the relationship between shaft 173 and spindle 170 are such that spindle 170 is not retracted into space 183 until the free end of lever 177 is moved completely away from the opening of magazine chamber 46. Inasmuch as the inner surface of the free end of the lever 177, as viewed in Figure 4, lies immediately adjacent the outer end of magazine 50, the magazine cannot be moved until the lever is completely shifted away from the opening of the magazine compartment. Thus there is no possibility of a slight initial withdrawing movement of the magazine jamming spindle 170 and sprocket 59.

Thus when the operator of the camera loads the camera, door 48 (Figure 3) is swung open. If lever 177 is in the position shown, it is impossible to insert the film magazine. Then the operator moves lever 177, and accordingly spindle 369 (Figure 4) retracts from magazine compartment 46 so that the magazine may be inserted therein. Unless the magazine is properly positioned within its compartment, lever 177 cannot be swung into position shown in Figure 4. When the magazine is properly positioned, however, the lever may be swung to the position shown, with the result that the spindle 170 is in position to engage sprocket 59 and can engage therewith when the teeth on the spindle register with the pockets in the sprocket. Also when the several parts are in this position, the door 48 may be swung closed so that the hole therein may register with and receive lever pin 178. It should be noted that the door cannot be completely closed if the hole therein does not register with pin 178 as long as any portion of the free end of lever 177 (Figure 4) blocks the opening to magazine chamber 46. This assures complete engagement between spindle 170 and sprocket 59 before the camera is operated.

It may now be seen that I have provided a controllable driving connection between the camera film feeding mechanism and the film magazine which attains in a thoroughly practical and efficient manner the several objects set forth hereinabove.

As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In motion picture camera construction, in combination, a casing having a chamber formed therein adapted to receive a film magazine, a film magazine in said chamber and including a rotatable sprocket adapted upon operation to move the film past an opening in the magazine, means in said casing for driving said sprocket, means forming a driving connection between said driving means and said sprocket, said last-mentioned means including a retractable spindle movable between engaged and disengaged positions with respect to said sprocket, means for moving said spindle into and out of engagement with said sprocket, said last-mentioned means including a rotatable shaft the inner end of which is operatively connected to said spindle to effect sprocket engaging and disengaging operation thereof the outer end of said shaft lying adjacent a side of said casing and accessible for manual operation.

2. In motion picture camera construction, in combination, a casing having a chamber formed therein adapted to receive a film magazine, a film magazine in said chamber and including a rotatable sprocket adapted upon operation to move the film past an opening in the magazine, means in said casing for driving said sprocket, means forming a driving connection between said driving means and said sprocket, said last-mentioned means including a retractable spindle movable between engaged and disengaged positions with respect to said sprocket, means for moving said spindle into and out of engagement with said sprocket, said last-mentioned means including a rotatable shaft the inner end of which is operatively connected to said spindle to effect sprocket engaging and disengaging operation thereof the outer end of said shaft lying adjacent a side of said casing and accessible for manual operation, and a manually operable lever fastened to said shaft for manual operation thereof, said lever extending into said chamber.

3. In motion picture camera construction, in combination, a casing having formed therein an elongated chamber openable at one end thereof and adapted to slidably receive a film magazine, a film magazine in said chamber and including a rotatable sprocket adapted upon operation to move the film past an opening in the magazine, means in said casing for driving said sprocket, means forming a driving connection between said driving means and said sprocket, said last-mentioned means including a retractable spindle movable between engaged and disengaged positions with respect to said sprocket, and means for moving said spindle between its engaged and disengaged positions, said last-mentioned means including a lever one end of which extends across at least a portion of the entrance to said chamber when said spindle is in its sprocket engaging position to block the entrance against withdrawal of or insertion of the film magazine with respect to said chamber.

4. In motion picture camera construction, in combination, a casing having formed therein an elongated chamber openable at one end thereof and adapted to slidably receive a film magazine, a film magazine in said chamber and including a rotatable sprocket adapted upon operation to move the film past an opening in the magazine, means in said casing for driving said sprocket, means forming a driving connection between said driving means and said sprocket, said last-mentioned means including a retractable spindle movable between engaged and disengaged positions with respect to said sprocket, means for moving said spindle between its engaged and disengaged positions, said last-mentioned means including a lever one end of which extends across at least a portion of the entrance to said chamber when said spindle is in its sprocket engaging position to block the entrance against withdrawal of or insertion of the film magazine with respect to said chamber, and means forming a closure for said chamber, said closure having formations thereon engageable with said lever end to preclude movement of said closure to its closed position except when said lever is moved to the extremities of its spindle engaging or disengaging positions.

5. A camera having a chamber therein adapted to slidably receive a film magazine, said film magazine having in one side thereof a sprocket adapted to be driven, a driving spindle rotatably mounted in said camera and movable axially into and out of said chamber to engage and disengage said sprocket, manually operable means for moving said spindle between its engaged and disengaged positions, said manually operable means including a lever, a door hingedly mounted on said camera for closing said chamber, and means on said lever for preventing complete closing of said door unless said lever is in its spindle engaging position.

6. A camera having a chamber therein adapted to slidably receive a film magazine, said film magazine having in one side thereof a sprocket adapted to be driven, a driving spindle rotatably mounted in said camera and movable axially into and out of said chamber to engage and disengage said sprocket, manually operable means for moving said spindle between its engaged and disengaged positions, said manually operable means including a lever, a door hingedly mounted on said camera for closing said chamber, and means on said lever for preventing complete closing of said door unless said lever is in its spindle engaging position, said last-mentioned means comprising a projection on the end of said lever adapted to enter an opening in said door when said lever is in its spindle engaging position to permit complete closing of the door.

CLINTON B. GATY.